United States Patent
Kim et al.

(10) Patent No.: US 10,409,498 B2
(45) Date of Patent: Sep. 10, 2019

(54) METHOD AND APPARATUS FOR MANAGING MEMORY

(71) Applicant: Samsung Electronics Co., Ltd., Suwon-si, Gyeonggi-do (KR)

(72) Inventors: Kibeom Kim, Seoul (KR); Jinkyu Koo, Yongin-si (KR); Kwonsik Kim, Suwon-si (KR); Hyojeong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 15/172,951

(22) Filed: Jun. 3, 2016

(65) Prior Publication Data

US 2016/0357455 A1 Dec. 8, 2016

(30) Foreign Application Priority Data

Jun. 4, 2015 (KR) ........................ 10-2015-0079037

(51) Int. Cl.
*G06F 3/06* (2006.01)

(52) U.S. Cl.
CPC .......... *G06F 3/0611* (2013.01); *G06F 3/0631* (2013.01); *G06F 3/0665* (2013.01); *G06F 3/0673* (2013.01)

(58) Field of Classification Search
CPC .... G06F 3/0611; G06F 3/0631; G06F 3/0665; G06F 3/0673; G06F 3/0655; G06F 3/0659; G06F 3/0661
See application file for complete search history.

(56) References Cited

U.S. PATENT DOCUMENTS

| 6,130,759 | A  | * | 10/2000 | Blair | G06F 12/023 |
| | | | | | 358/1.15 |
| 6,182,089 | B1 | * | 1/2001 | Ganapathy | G06F 12/023 |
| 6,496,909 | B1 | * | 12/2002 | Schimmel | G06F 12/10 |
| | | | | | 710/200 |
| 8,375,191 | B2 | | 2/2013 | Kim | |
| 9,781,057 | B1 | * | 10/2017 | Foley | H04L 47/805 |
| 2001/0042184 | A1 | | 11/2001 | Sethi | |
| 2002/0199075 | A1 | * | 12/2002 | Jacobs | G06F 12/023 |
| | | | | | 711/163 |

(Continued)

FOREIGN PATENT DOCUMENTS

| EP | 2 750 042 A1 | 7/2014 |
| KR | 10-1618634 B1 | 5/2016 |

OTHER PUBLICATIONS

European Search Report dated Apr. 20, 2018, issued in European Patent Application No. 16803775.2.

*Primary Examiner* — Michael Krofcheck
(74) *Attorney, Agent, or Firm* — Jefferson IP Law, LLP

(57) ABSTRACT

A method for managing a memory and an electronic device are provided. The method includes setting a list including an exclusive relationship, between a page unit memory allocation requester and a contiguous memory allocation requester, corresponding to a segment of a contiguous memory allocation region, receiving a memory allocation request, confirming whether the memory allocation requester comprises the memory allocation requester included in the list, and allocating a page of the contiguous memory allocation region corresponding to the segment, if the memory allocation requester is included in the list.

16 Claims, 11 Drawing Sheets

(56) References Cited

U.S. PATENT DOCUMENTS

| | | | |
|---|---|---|---|
| 2004/0064671 A1 | 4/2004 | Patil | |
| 2007/0101333 A1* | 5/2007 | Mewhinney | G06F 9/485 |
| | | | 718/102 |
| 2008/0091911 A1 | 4/2008 | Fleming et al. | |
| 2008/0148002 A1 | 6/2008 | Fleming | |
| 2011/0055511 A1* | 3/2011 | Mantor | G06F 9/5016 |
| | | | 711/170 |
| 2011/0231550 A1* | 9/2011 | Murray | G06F 9/5011 |
| | | | 709/226 |
| 2012/0311606 A1* | 12/2012 | Marathe | G06F 9/526 |
| | | | 718/107 |
| 2013/0013884 A1 | 1/2013 | Ueno | |
| 2013/0031293 A1* | 1/2013 | Van Riel | G06F 12/10 |
| | | | 711/6 |
| 2014/0040577 A1* | 2/2014 | Gheith | G06F 12/023 |
| | | | 711/162 |
| 2014/0089625 A1 | 3/2014 | Assarpour | |
| 2014/0156944 A1 | 6/2014 | Lee et al. | |
| 2014/0173613 A1* | 6/2014 | Dunn | G06F 9/5061 |
| | | | 718/104 |
| 2014/0189272 A1 | 7/2014 | Shin | |
| 2014/0324917 A1* | 10/2014 | Haas | G06F 12/0253 |
| | | | 707/803 |
| 2016/0154740 A1* | 6/2016 | Jackson | G06F 9/30138 |
| | | | 711/126 |
| 2017/0102891 A1* | 4/2017 | Torpey | G06F 3/0619 |

* cited by examiner

METHOD AND APPARATUS FOR MANAGING MEMORY

CROSS-REFERENCE TO RELATED APPLICATION(S)

This application claims the benefit under 35 U.S.C. § 119(a) of a Korean patent application filed on Jun. 4, 2015 in the Korean Intellectual Property Office and assigned Serial number 10-2015-0079037, the entire disclosure of which is hereby incorporated by reference.

TECHNICAL FIELD

The present disclosure relates to a method and an apparatus for managing a memory. More particularly, the present disclosure relates to a method and an apparatus for improving a memory allocation speed through an efficient management when memory allocation is requested.

BACKGROUND

Recently, with the development of technology, various kinds of electronic devices include diverse functions. As an example, in the case of a mobile terminal, various kinds of multimedia functions, such as television (TV) viewing function (e.g., mobile broadcasting such as digital multimedia broadcasting (DMB) or digital video broadcasting (DVB)), music reproduction function (e.g., Moving Picture Experts Group phase 1 or phase 2 (MPEG-1 or MPEG-2) audio layer-III (MP3)), photographing function, internet connection function, and dictionary search function, have been added thereto in addition to general communication functions, such as voice call and message transmission/reception. Accordingly, memory allocation requests for executing various kinds of multimedia functions has increased, and in this case, if a memory is not effectively managed, it becomes unable to allocate the memory to cause a program that requires execution to stop executing.

In particular, if contiguous memory allocation is requested, it is required to secure a memory space for allocating the contiguous memory. If contiguous memory space is not secured, memory reclaim and/or memory migration are demanded to secure the memory, and this may cause memory allocation performing time to increase to deteriorate the quality of experience. Accordingly, there is a need for a memory allocation method through efficient management of the memory.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for managing a memory.

Another aspect of the present disclosure is to provide a method and an apparatus for improving a memory allocation speed through an efficient management when memory allocation is requested.

Another aspect of the present disclosure is to provide a method and an apparatus for improving a memory allocation speed through migration minimization during contiguous memory allocation.

In accordance with an aspect of the present disclosure, a method for managing a memory is provided. The method includes setting a list including an exclusive relationship, between a page unit memory allocation requester and a contiguous memory allocation requester, corresponding to a segment of a contiguous memory allocation region, receiving a memory allocation request, confirming whether the memory allocation requester comprises the memory allocation requester included in the list, and allocating a page of the contiguous memory allocation region corresponding to the segment of the list, if the memory allocation requester is included in the list.

In accordance with another aspect of the present disclosure, an electronic device is provided. The electronic device includes a memory including a contiguous memory allocation region, and a memory management unit. The memory management unit is configured to set a list including an exclusive relationship, between a page unit memory allocation requester and a contiguous memory allocation requester, corresponding to a segment of the contiguous memory allocation region, receive a memory allocation request, confirm whether the memory allocation requester comprises the memory allocation requester included in the list, and allocate a page of the contiguous memory allocation region corresponding to the segment, if the memory allocation requester is included in the list.

According to the aspects of the present disclosure, a method and an apparatus for managing a memory can be provided.

Further, according to the aspects of the present disclosure, a method and an apparatus for improving a memory allocation speed through an efficient management when memory allocation is requested can be provided.

Further, according to the aspects of the present disclosure, a method and an apparatus for improving a memory allocation speed through migration minimization during contiguous memory allocation can be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
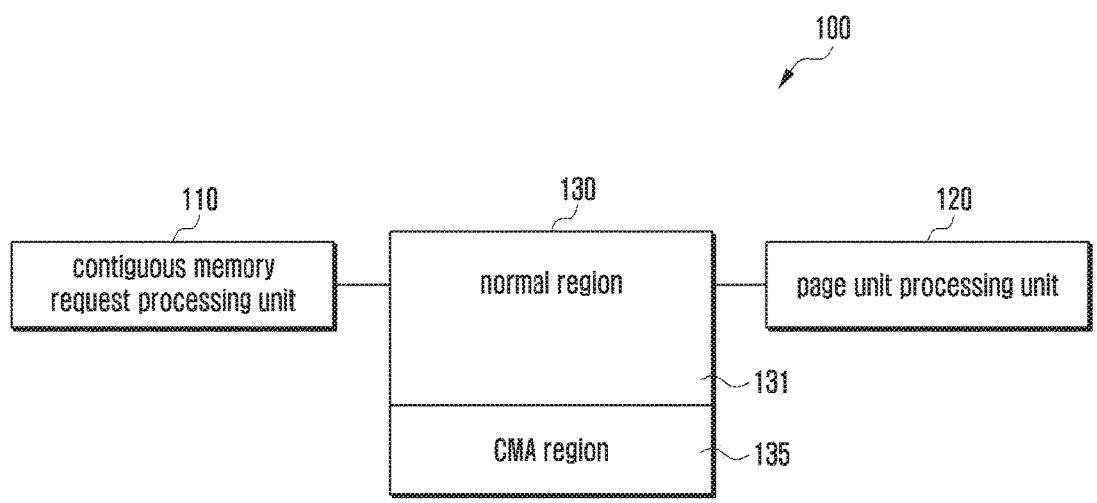
FIG. 1 is a diagram illustrating the configuration of an electronic device including a memory according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In an embodiment of the present disclosure, a memory means a storage device that operates together with an electronic device.

In an embodiment of the present disclosure, the terms "migration" and "movement" have the same concept.

In an embodiment of the present disclosure, dynamic memory allocation or memory dynamic allocation means to dynamically perform memory allocation and memory reclaim in accordance with execution of a specific application or device and/or memory request.

In an embodiment of the present disclosure, contiguous memory allocation (CMA) has the concept that is in contrast to the concept of page unit memory allocation, and means a contiguous memory region having a size that is equal to or larger than the size of a page.

In an embodiment of the present disclosure, a CMA requester may correspond to hardware (HW), and a page unit memory allocation requester may correspond to an application. In general, the subject of the request for physically contiguous memory is an HW intellectual property (HW IP) block that uses memory transmission through direct memory access (DMA). However, this is general and the scope of the present disclosure is not limited thereto. The application may also request the contiguous memory allocation.

In an embodiment of the present disclosure, a kernel has a memory manager which manages address spaces of the operating system in a memory or a storage device and equally distributes the address spaces to all peripheral devices and other users who use services of the kernel. The services of the kernel are requested through other parts of the operating system or a series of program interfaces that are commonly known as system calls.

FIG. 1 is a diagram illustrating the configuration of an electronic device including a memory according to an embodiment of the present disclosure.

Referring to FIG. 1, an electronic device 100 may include a contiguous memory request processing unit 110, a page unit processing unit 120, and a memory 130. The memory 130 includes a normal region 131 and a CMA region 135. The contiguous memory request processing unit 110 and the page unit processing unit 120 may be included in a memory management unit. Further, the electronic device 100 may include at least one application that uses the memory 130 and at least one piece of HW.

If a contiguous memory request is received, the contiguous memory request processing unit 110 confirms a contiguous memory region corresponding to the contiguous memory request, secures contiguous memory space by arranging (reclaiming or moving) the memory if the contiguous memory region is not confirmed, and allocates the secured contiguous memory space corresponding to the contiguous memory request. The contiguous memory request processing unit 110 may allocate the contiguous memory region of the CMA region.

If a memory allocation request is received other than the contiguous memory request (e.g., a page unit memory allocation request is received), the page unit processing unit 120 may allocate the memory of a page unit to the normal region 131 or the CMA region 135.

The normal region 131 may be a region that is used to allocate the memory with respect to the memory allocation request that is not the CMA request.

The CMA region 135 may be a CMA region that is set to allocate the contiguous memory. The CMA region may be a region that is set to process the CMA request. The CMA region may be used to allocate the contiguous memory. If there is not the CMA request, the CMA region may be used even to allocate the page unit memory, whereas if there is the CMA request, the CMA region may be a region that is used to arrange (reclaim or move) the page unit memory allocation and to allocate the contiguous memory.

The CMA region 135 that is an example of the CMA region may be a region for the kernel to process the contiguous memory request. In order to process the physically contiguous memory request, the kernel may manage a partial region of the whole memory region that is managed by the kernel itself as the CMA region. Before the contiguous memory request is generated, the CMA region 135 is used when the kernel allocates a page of which the migration type is "movable." Thereafter, if the contiguous memory request enters, the foremost portion of the CMA region is entirely made to be in a free state by moving the corresponding region through reclaiming or moving of the allocated page with respect to the size of the request, and then the next start address is notified.

Figure 2:
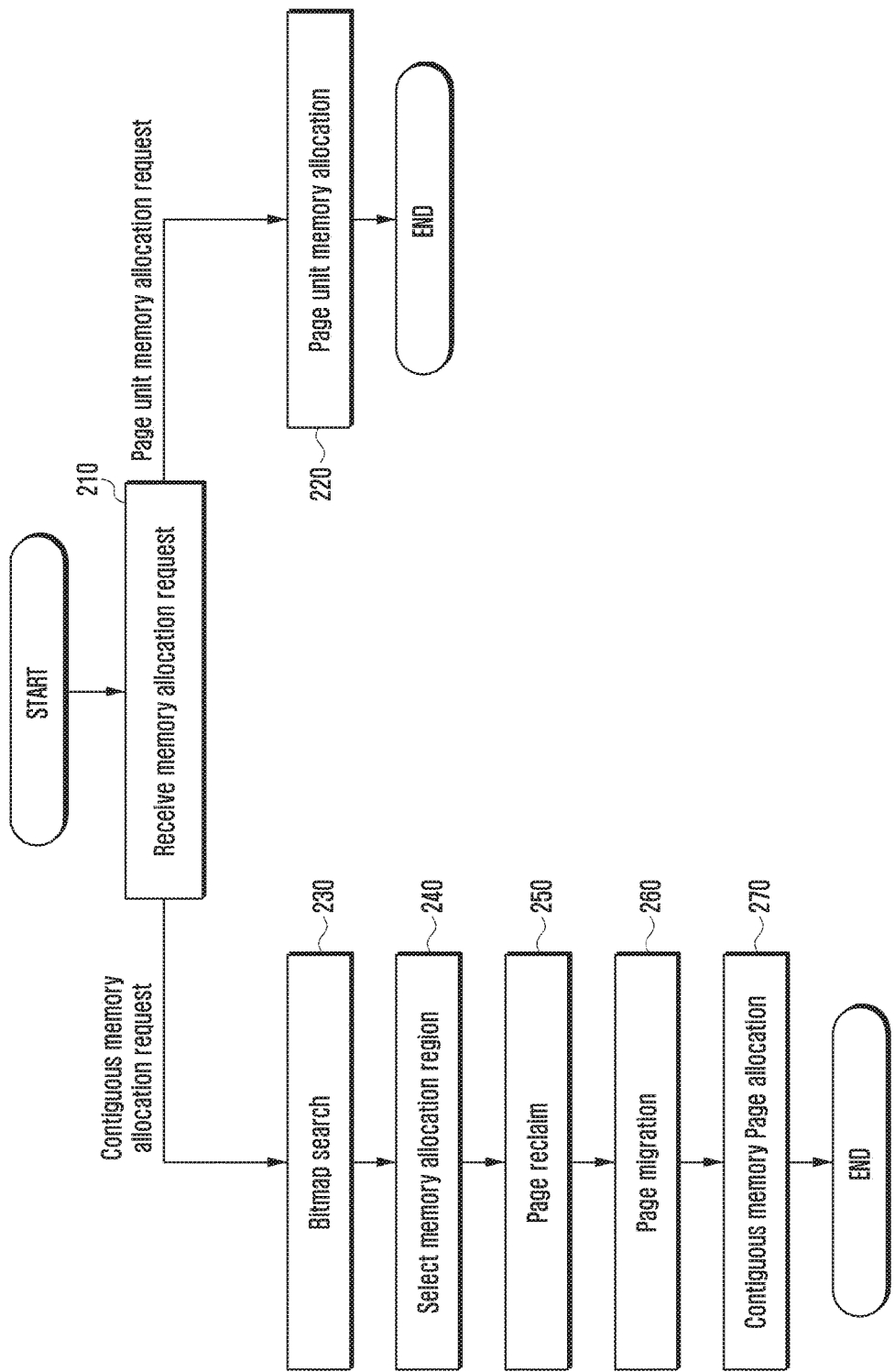
FIG. 2 is a diagram illustrating a memory allocation process according to an embodiment of the present disclosure.

FIG. 2 is a diagram illustrating a memory allocation process according to an embodiment of the present disclosure.

The CMA region may be initialized when the electronic device is booted. The location and the size of the CMA region are selected in the whole memory. The CMA region is initialized after a bitmap that indicates information allocated to the contiguous memory in the CMA region is allocated to another memory region except for the CMA region. Thereafter, the page unit processing unit is notified of the fact that the page of the CMA region is a memory allocable page (free page).

Referring to FIG. 2, at operation 210, the memory management unit may receive the memory allocation request. The memory management unit may confirm whether the memory allocation request is the CMA request or the page unit memory allocation request. If the memory allocation request is the page unit memory allocation request, the processing proceeds to operation 220, whereas if the memory allocation request is the CMA request, the processing proceeds to operation 230.

Operation 220 may be performed by the page unit processing unit of the memory management unit. Further, operation 230 and the subsequent operations may be performed by the contiguous memory request processing unit of the memory management unit.

At operation 220, the page unit processing unit may allocate the page unit memory (page) corresponding to the requested size. In order to process the page unit memory, the page unit processing unit may request a buddy allocator to allocate the page unit memory. The page unit processing unit may request a page of a desired size from the buddy allocator to be allocated with the page, and may transfer the allocated page to the buddy allocator as a return to make the corresponding page reusable. The page unit memory may be allocated to the normal region of the memory or may be allocated to the CMA region. However, it is required that the page unit memory request that is allocated to the CMA region is a memory allocation request that can be reclaimed or moved in response to the CMA request.

If the memory allocation request is the CMA request, the contiguous memory request processing unit may allocate the contiguous page of the requested size using operation 230 and the subsequent operations.

At operation 230, the memory management unit performs a bitmap search. The memory management unit may store bitmap information therein. The bitmap information indicates the allocation state of each page of the CMA region. The allocation state may indicate whether each page is currently allocated to another application or HW. In the case where the page is currently allocated to another application or HW, it is unable to be allocated with respect to another memory allocation request unless the corresponding page is reclaimed or moved. The location for allocating the contiguous page may be searched for on the basis of the bitmap information. The search may be a search to avoid the region that is allocated as the contiguous memory.

At operation 240, the memory management unit selects the memory allocation region (contiguous page region) having a size that is equal to or larger than the size of the contiguous memory that is requested to correspond to the CMA request on the basis of the bitmap search. The memory management unit may select the contiguous page region to avoid the region that is allocated as the contiguous memory on the basis of the bitmap search. Accordingly, if there is not a page that is allocated as the contiguous memory, the memory management unit selects a start point, whereas if there is a page that is allocated as the contiguous memory, the memory management unit selects a next location of the region that is allocated as the contiguous memory.

Accordingly, pages in the selected memory region are listed. The selected memory region may include an allocable page (free page), a reclaimable page, and a migration page. The selected contiguous page region may be a region that can secure the contiguous page region having a size that is equal to or larger than the size of the requested contiguous memory after the reclaimable page is reclaimed and the movable page is moved. On the basis of the list, operations 250 and 260 are performed.

At operation 250, the memory management unit performs page reclaim with respect to the reclaimable pages in the selected contiguous page region. The reclaimed page becomes a memory allocable page (free page).

At operation 260, the memory management unit performs page migration with respect to the movable pages in the selected contiguous page region. The migration means movement of data of the corresponding page or resources to another page. After the migration, the corresponding page becomes a memory allocable page (free page).

After operations 250 and 260, the page that is allocated in the unit of a page in the selected memory region does not exist. The selected page region becomes a region to which the contiguous page can be allocated. At operation 270, the memory management unit may allocate the contiguous memory page having a size corresponding to the requested contiguous allocation memory request in the selected contiguous page region. The contiguous memory page can be secured by the page reclaiming and the page movement.

Through the methods as illustrated in FIGS. 1 and 2, the contiguous page allocation in accordance with the contiguous memory request according to an embodiment of the present disclosure becomes possible.

According to an embodiment, the contiguous memory request processing unit selects the location of the preferentially contiguous page region using the bitmap information that indicates whether to allocate the contiguous memory, and then confirms all pages in the corresponding region. In this case, the reclaimable page is reclaimed, and the remainder is moved to another region, so that all the allocated pages of the corresponding region are removed.

In this case, the page movement is a great expense in terms of computing resources. First, there is great deviation in time that is consumed for the CMA in accordance with the number of page movements. If there is a large number of pages to be moved in the contiguous memory space to be allocated, allocation time in the unit of a second may be consumed, and otherwise, time in the unit of several hundred milliseconds is consumed. The deviation may exert an influence on the operation in accordance with the kind of the HW or the application that is allocated with the contiguous memory.

Further, the page movement may be an operation that moves the page that is allocated in the unit of a page in the CMA region to a region excluding the CMA. Great page movement means that the existing free region has been allocated. Unnecessary page movement causes the memory efficiency to deteriorate.

In an embodiment of the present disclosure, improved memory allocation method and apparatus are provided. According to an embodiment of the present disclosure, performance deviation due to the page movement in the CMA region and an inefficient use of the memory can be resolved. According to an embodiment of the present disclosure, a method and an apparatus for improving the CMA speed through minimization of the page movement are provided.

Figure 3:
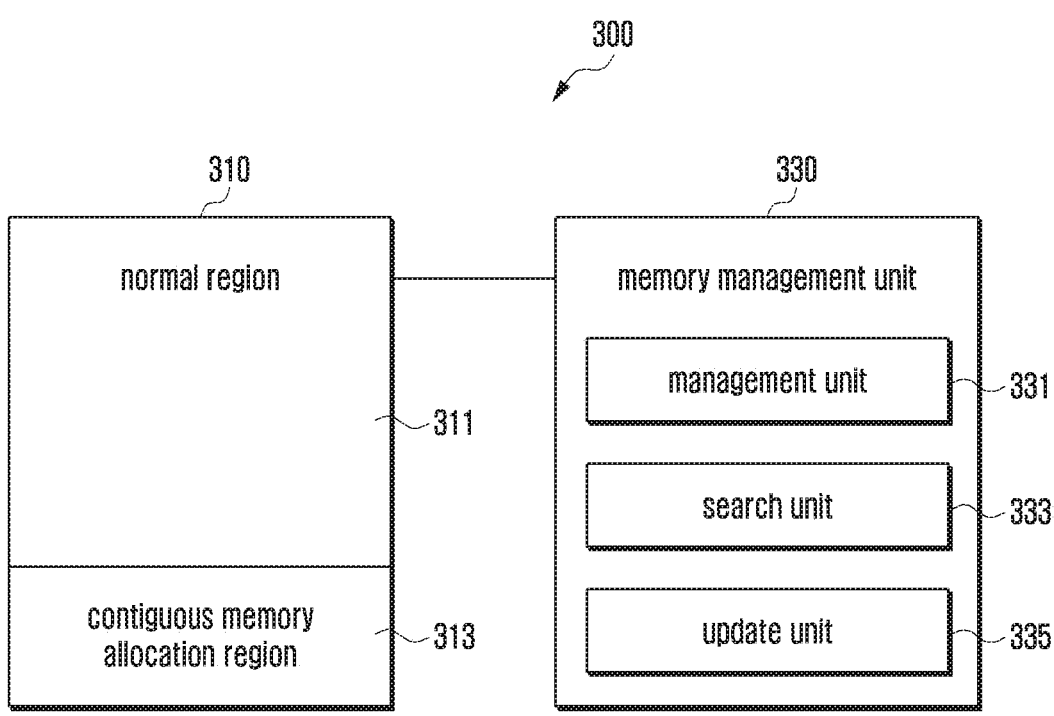
FIG. 3 is a diagram illustrating the configuration of an electronic device including a memory according to an embodiment of the present disclosure.

FIG. 3 is a diagram illustrating the configuration of an electronic device including a memory according to an embodiment of the present disclosure.

Referring to FIG. 3, an electronic device 300 may include a memory 310 and a memory management unit 330. The memory management unit 330 may include a management unit 331, a search unit 333, and an update unit 335. At least one of the management unit 331, the search unit 333, and the update unit 335 may be provided on the outside of the memory management unit 330. The memory 310 may include a normal region 311 and a CMA region 313. The normal region 311 may be a region that is used for memory allocation request that is not the CMA request and for page unit memory allocation request. The CMA region 313 may be a region for allocating a contiguous memory page in response to the CMA request. The CMA region may be used to allocate the contiguous memory page with respect to the CMA request, and if there is no CMA request, the CMA region may also be used for the page unit memory allocation. The page unit memory request that is allocated to the CMA region may be reclaimed or moved if there is the CMA request.

Further, the electronic device 300 may include (not shown least one application using the memory 310 and at least one piece of HW.

The memory management unit 330 may manage the memory for the memory allocation, and may allocate a memory page in response to the memory allocation request.

The management unit 331 may perform a memory management operation. The management unit 331 may manage segmentation. In an embodiment of the present disclosure, segmentation means an operation to divide the CMA region in the unit of a segment and an operation to manage an application and/or HW corresponding to each segment in the unit of a segment. The application and/or HW corresponding to the segment may be managed through a list. The list may be a segment list. The management unit 331 may include a segment manager that manages the segment.

The search unit 333 operates to search for a region where the migration is minimized or the migration does not occur in the CMA region 313. The search unit 320 may search for the region where the migration is minimized on the basis of the bitmap information of the CMA region. The bitmap information may be bitmap information that indicates whether the page is reclaimable. The reclaimable page can be confirmed through the bitmap information. For example, the bitmap may be managed in a manner that "1" is displayed if the corresponding page is reclaimable, whereas "0" is displayed if the corresponding page is not reclaimable. In order to secure the contiguous page, the non-reclaimable page may be a page of which the migration should be performed. The large number of reclaimable pages in a specific region means the small number of migration pages. Since time that is consumed to reclaim the page is short and time that is used for page migration is relatively longer than the time for the page reclaim, it is important to search for a region in which the migration is minimized.

The update unit 335 updates the bitmap information of the contiguous memory region. The update unit 335 may be included in the search unit 333. It is updated whether the page is reclaimable on the basis of information on the application or FEW that uses the memory page. Each task displays page information according to the characteristic thereof. The page information may include dirty, write-hack, and reference count values. The update unit 335 confirms whether the page is reclaimable on the basis of the page information, and updates the bitmap information of the corresponding page to "1" if the page is reclaimable, and to "0" if the page is not reclaimable. The updated bitmap information may be used to search for the contiguous page of which the migration is minimized during the contiguous page search.

Although the operations of the management unit 331, the search unit 333, and the update unit 335 have been dividedly explained, the operations according to the present disclosure are not limited thereto. The operations of the management unit 331, the search unit 333, and the update unit 335 may be performed by the memory management unit 330. The memory management unit 330 may be called a control unit, a controller, or a memory management processor.

According to an embodiment of the present disclosure, the memory management unit 330 sets a list including an exclusive relationship between a page unit memory allocation requester and a CMA requester in a segment of the CMA region, receives the memory allocation request, confirms whether the memory allocation requester included in the list, and allocates a page of the CMA region corresponding to the segment of the list if the memory allocation requester is included in the list.

Further, the memory management unit 330 may manage the bitmap information of the CMA region, and the bitmap information may indicate whether the page included in the CMA region is reclaimable.

Further, the memory management unit 330 may determine whether the memory allocation request is the CMA request, and if the memory allocation request is the CMA request, the memory management unit 330 may operate to select the contiguous memory page region for processing the CMA request on the basis of the bitmap information. Further, the memory management unit 330 may select the region having the minimum page movement for the requested CMA among the CMA region as the contiguous memory page region. In this case, the region having the minimum page movement may be a region having the maximum number of reclaimable pages on the basis of the bitmap information among the contiguous page region corresponding to the CMA request.

Further, if the reclaimable information of the page included in the contiguous memory region is changed, the memory management unit 330 may operate to update the bitmap information.

Further, the memory management unit 330 may sense a simultaneous activation state of the memory with respect to a page unit memory allocation requester and a CMA requester that are included in the same segment of the list, and may operate to remove the page unit memory allocation requester from the segment of the list.

Further, the memory management unit 330 may receive a memory allocation request of a new page unit memory allocation requester, confirm whether there is a currently activated CMA requester, and if there is the activated CMA requester, operate not to add the new page unit memory allocation requester to the segment of the list in which the activated CMA requester is included.

Further, the memory management unit 330 may add the new page unit memory allocation requester to a temporary list of the segment of the list in which the activated CMA requester is not included, determine whether the exclusive relationship is satisfied with respect to the CMA requester corresponding to the new page unit memory allocation requester of the temporary list for a predetermined time, and if the exclusive relationship is satisfied, operate to add the new page unit memory allocation requester to the segment in which the exclusive relationship is satisfied with respect to the new page unit memory allocation requester in the list.

The page unit memory processing operation may be divided into an operation of releasing the allocated memory and an operation of allocating the memory. Hereinafter, referring to FIGS. 4 and 5, the operation of processing the page unit memory will be described.

Figure 4:
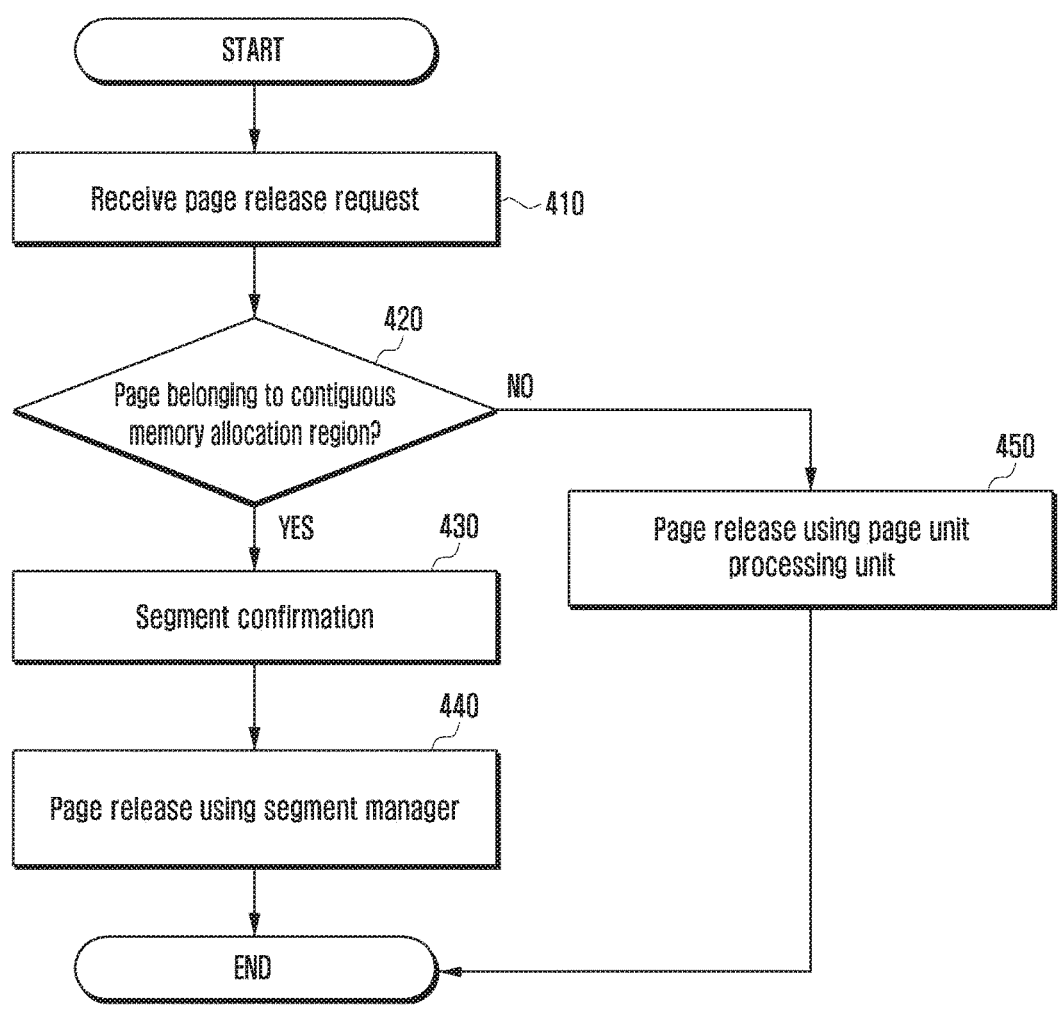
FIG. 4 is a diagram explaining a page unit memory release process according to an embodiment of the present disclosure.

FIG. 4 is a diagram explaining a page unit memory release process according to a second embodiment of the present disclosure.

Referring to FIG. 4, at operation 410, the memory management unit receives a page release request.

At operation 420, the memory management unit may determine whether the page release request is the release request for the page of the CMA region. If the page release request is the release request for the page that belongs to the CMA region, the processing proceeds to operation 430 and the subsequent operation, whereas if the page release request is not the release request for the page that belongs to the CMA region, the processing proceeds to operation 450.

If the page release request is the release request for the page that belongs to the CMA region, the segment to which the corresponding page belongs is confirmed, at operation 430.

At operation 440, the corresponding page is released by a segment manager that manages the corresponding segment. The segment manager may operate in the same manner as the buddy allocator, and may manage the page (free page) released in red-black tree or linked list type.

If the page release request is not the release request for the page that belongs to the CMA region, at operation 450, a page release operation is performed using the page unit processing unit. The page unit processing unit transfers the page release request to the buddy allocator to release the corresponding page.

Figure 5:
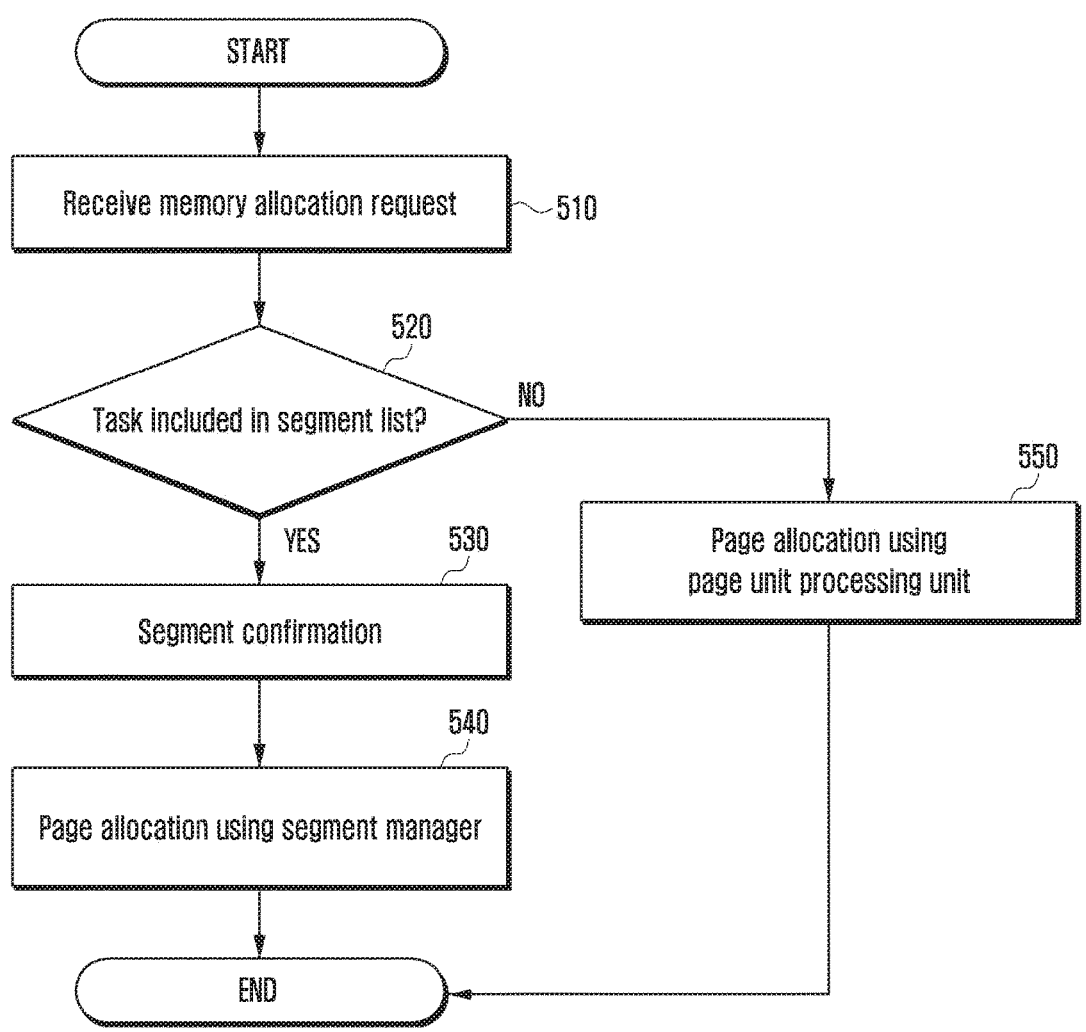
FIG. 5 is a diagram explaining a page unit memory allocation process according to an embodiment of the present disclosure.

FIG. 5 is a diagram explaining a page unit memory allocation process according to a second embodiment of the present disclosure.

Referring to FIG. 5, at operation 510, the memory management unit receives a memory allocation request. The memory allocation request may be a page unit memory all request.

At operation 520, the memory management unit confirms a memory allocation task (application or HW), in other words, the memory management unit determines whether the corresponding task is a task included in the segment list, at operation 520.

Table 1 shows a segment list according to an embodiment of the present disclosure.

TABLE 1

| Segment | Attribute | Memory allocation requester |
| --- | --- | --- |
| Segment 1 | CMA requester | First piece of HW |
| | Page unit memory allocation requester | First application and second application |
| Segment 2 | CMA requester | Second piece of HW |
| | Page unit memory allocation requester | Third application and fourth application |
| ... | ... | ... |

Figure 6:
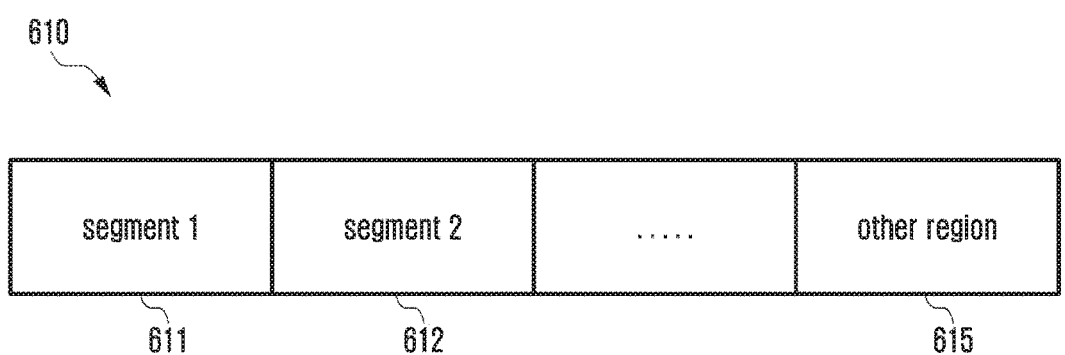
FIG. 6 is a diagram explaining a contiguous memory allocation region according to an embodiment of the present disclosure.

FIG. 6 is a diagram explaining a CMA region according to an embodiment of the present disclosure.

Referring to FIG. 6, a CMA region 610 includes a segment 1 in region 611, a segment 2 in region 612, and other region 615. If there is a memory allocation request from a memory allocation requester included in the segment list, the segment regions 611 and 612 are used to allocate a memory page included in the corresponding segment region. If there is a memory allocation request from a memory allocation requester that is not included in the segment list, a memory page of the other region 615 may be allocated.

The segment list may be a list of a CMA requester and a page unit memory allocation requester that are in an exclusive relationship. The memory allocator requester may be HW or an application (task). The CMA requester and the page unit memory allocation requester of the same segment are in an exclusive relationship. The exclusive relationship means the relationship between memory allocation requesters that do not simultaneously request the memory allocation. For example, in Table 1, the CMA requester of segment 1 may be a first piece of HW, and the page unit memory allocation requester may be a first application and a second application. In this case, the first piece of HW is in the exclusive relationship with the first application and the second application. If the memory allocation of the first piece of HW is requested, the first application and the second application do not request the memory allocation request. In contrast, if the first application and the second application request the memory allocation, the first piece of HW does not require the memory allocation. For example, it may be assumed that the electronic device is a television (TV), the first piece of HW is HW for moving image reproduction, and the first application may be a game application. In general, since TV moving image viewing and the game application are not simultaneously used, the first piece of HW and the first application may be in the exclusive relationship in which they do not simultaneously request the memory allocation.

If there is the memory allocation request, the memory management unit may confirm the segment list, and may allocate the page of the segment region that corresponds to the segment list to the corresponding HW or application. For example, if there is the memory allocation request of the first piece of HW, the memory management unit may allocate the contiguous page of the first segment, while if there is the memory allocation request of the second piece of HW, the memory management unit may allocate the contiguous page of the second segment. If there is the memory allocation request of the first application or the second application, the memory management unit allocates the page of the first segment, while if there is the memory allocation request of the third application or the fourth application, the memory management unit allocates the page of the second segment.

The exclusive relationship may be related to the number of reclaimable pages. For example, if the page that is requested by the first application is allocated to the first segment, there may be the CMA request from the first HW. Since the first application and the first piece of HW are in the exclusive relationship, the page allocated with respect to the first application may mostly be the reclaimable page. Since the page with respect to the first application is mostly reclaimable, the number of migration target pages with respect to the first application is small. Accordingly, it is possible to secure the contiguous page region in the first segment in a short time, and the secured region can be allocated to the first piece of HW to reduce the memory allocation time. In an embodiment of the present disclosure, since the memory is allocated to the memory allocation requester that is in the exclusive relationship with the CMA region, memory use efficiency can be heightened, and the memory allocation time can be shortened.

At operation 520 of FIG. 5, it is determined whether page allocation request HW or application is included in the segment list. If it is included in the segment list, the processing proceeds to operation 530 and the subsequent operation, whereas if it is not included in the segment list, the processing proceeds to operation 550. For example, if there is the memory allocation request from one of the first to fourth applications in Table 1, it may be determined that the page allocation request HW or application is included in the segment list.

If the page allocation requester is included in the segment list, the processing proceeds to operation 530 to confirm the segment. If there is the memory allocation request from application 1 or application 2, it is determined that it corresponds to segment 1. If there is the memory allocation request from application 3 or application 4, it is determined that it corresponds to segment 2.

At operation 540, the corresponding page is allocated by a segment manager that manages the confirmed segment.

If the page allocation requester is not included in the segment list, the processing proceeds to operation 550 to perform the page allocation operation. The page unit processing unit performs the page allocation operation. The page allocation processing unit transfers the page allocation request to the buddy allocator to allocate the corresponding page. If the page allocation requester is not included in the segment list, the page of the normal region may be allocated, or the page of the other region that is not the region for a specific segment in the contiguous page allocation region may be allocated.

In an embodiment of the present disclosure, when the page of the CMA region is allocated with respect to the memory allocation request in the unit of a page, the page or the location of the page unit memory allocation region is determined on the basis of the segment to which the memory allocation requester belongs. Thereafter, if there is the contiguous memory request, the possibility of page reclaim according to the exclusive relationship is heightened, and the migration ratio is lowered, so that efficient CMA can be achieved.

Figure 7:
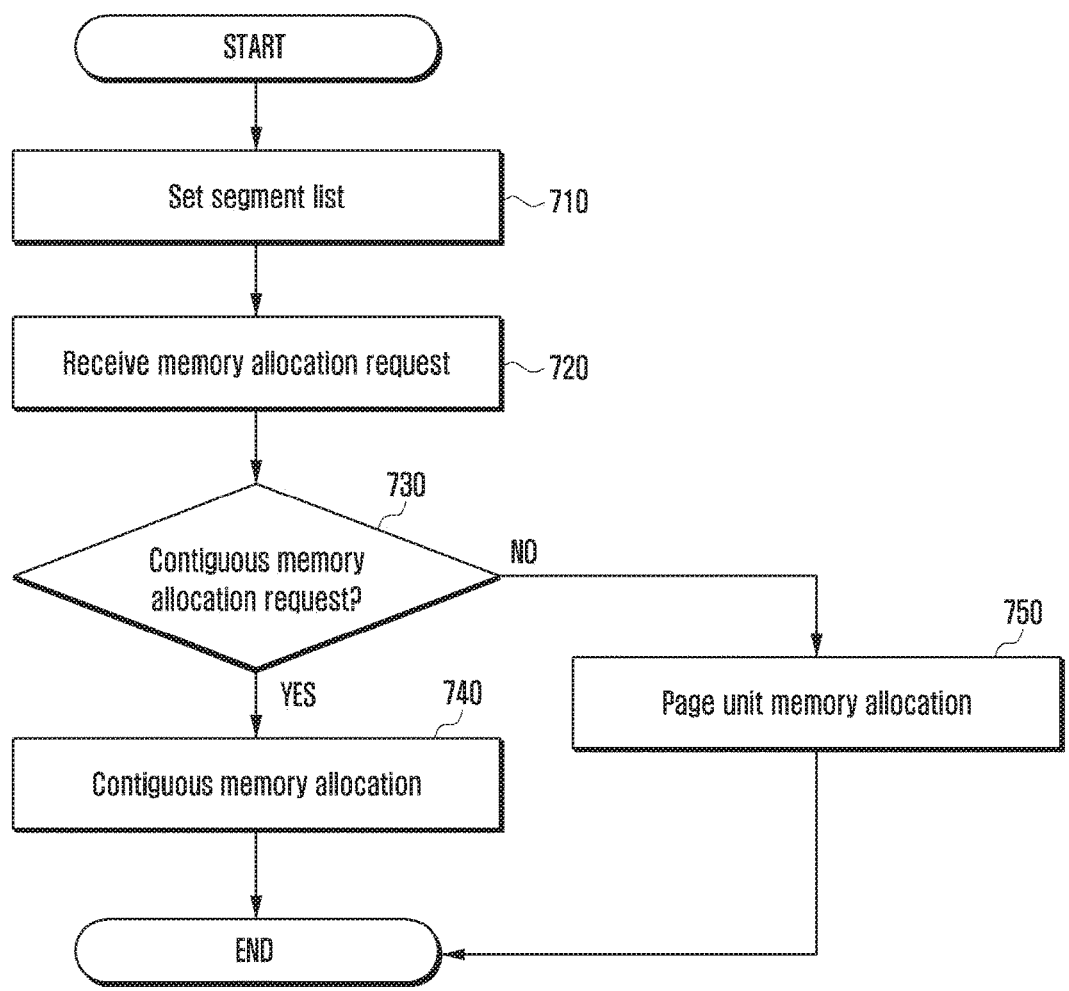
FIG. 7 is a diagram illustrating a memory allocation process according to an embodiment of the present disclosure.

FIG. 7 is a diagram illustrating a memory allocation process according to an embodiment of the present disclosure.

Referring to FIG. 7, at operation 710, the memory management unit sets a segment list. As explained with reference to Table 1, the segment list may be a list of a CMA requester and a page unit memory allocation requester that are in an exclusive relationship.

At operation 720, the memory management unit receives a memory allocation request, or confirms the memory allocation request.

At operation 730, the memory management unit determines whether the memory allocation request is a CMA request or a page unit memory allocation request. If the memory allocation request is the CMA request, the processing proceeds to operation 740, whereas if the memory allocation request is the page unit memory allocation request, the processing proceeds to operation 750.

If the memory allocation request is the CMA request, at operation 740, an operation for the CMA is performed. The memory management unit may allocate a contiguous memory page of a CMA region to a memory allocation requester. The operation for the CMA will be described in more detail with reference to FIG. 8.

If the memory allocation request is not the CMA request, the processing proceeds to operation 750. At operation 750, the memory management unit performs page unit memory allocation. In explaining the page unit memory allocation operation, the explanation of the page unit memory allocation operation as illustrated in FIGS. 4 and 5 is referred to.

Figure 8:
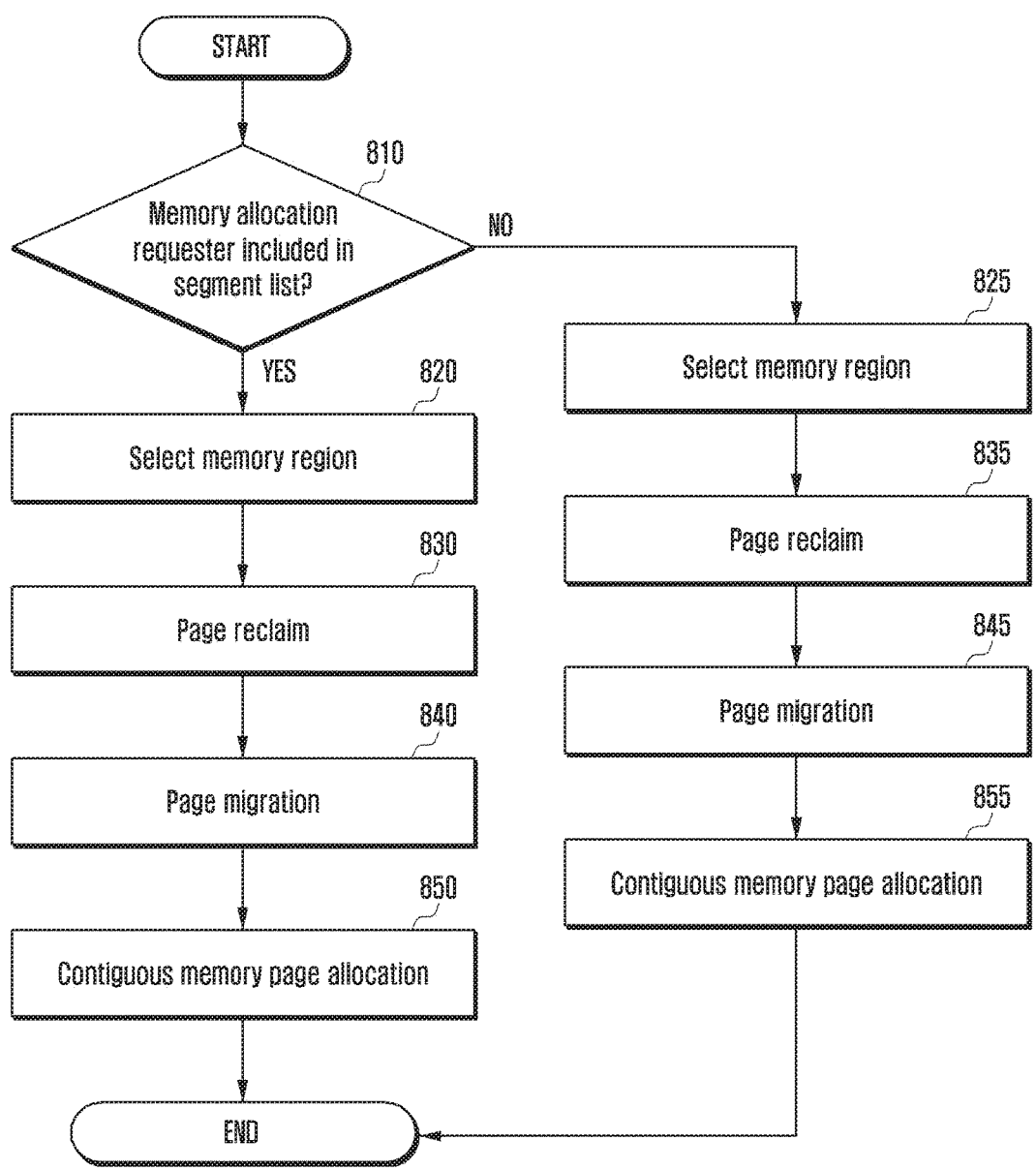
FIG. 8 is a diagram explaining a contiguous memory allocation process according to an embodiment of the present disclosure.

FIG. 8 is a diagram explaining a CMA process according to an embodiment of the present disclosure.

Referring to FIG. 8, at operation 810, the memory management unit determines whether a memory allocation requester that has requested CMA is included in a segment list. For example, referring to Table 1, if a memory allocation requester is a first piece of HW or a second piece of HW, the memory management unit determines that the memory allocation requester is included in the segment list. If the memory allocation requester is included in the segment list, the processing proceeds to operation 820, whereas if the memory allocation requester is not included in the segment list, the processing proceeds to operation 825.

At operation 820, the memory management unit selects a memory region for processing the requested CMA request. The memory management unit may select the memory region for processing the CMA request through searching for bitmap information. The memory management unit may select a contiguous page region to avoid a region that is allocated as a contiguous memory in the contiguous memory region. In this case, in an embodiment of the present disclosure, the whole contiguous page region is not searched for, but only the segment of the CMA region corresponding to the memory allocation requester is searched for to heighten the search speed. For example, if the memory allocation requester is the first piece of HW, a memory region for processing the CMA request may be selected through searching for the segment 1 corresponding to the first piece of HW. In order to avoid the region that is allocated as the contiguous memory through the search, the contiguous memory region that can process the requested CMA request may be selected. When selecting the memory region, as described with reference to FIG. 2, the bitmap information may be used.

In an embodiment of the present disclosure, the search may be performed using not only the bitmap information of FIG. 2 but also second bitmap information. The second bitmap information may be bitmap information indicating whether the page is reclaimable. The memory management unit may confirm the reclaimable page using the bitmap information. The memory management unit may select the contiguous memory region for processing the CMA request on the basis of the bitmap information that indicates whether the page is reclaimable. In this case, the memory management unit may set the region in which migration can be minimized as the region for processing the CMA request. On the basis of the bitmap information, the page that is not reclaimable may be a migration page to secure the contiguous page. Accordingly, the memory management unit may select the region in which migration is minimized in the region to which the contiguous memory is not allocated on the basis of the bitmap information.

Further, in an embodiment of the present disclosure, in the case of allocating a page unit memory to the CMA region, the page is allocated with respect to the memory allocation requester that is in the exclusive relationship. If there is the CMA request from the CMA requester, there is high probability that the page unit memory that is allocated to the CMA region becomes a reclaimable page. Through this, time that is consumed for the memory region selection, memory reclaim, and memory movement can be reduced, and thus the CMA efficiency can be improved.

At operation 830, the memory management unit reclaims the reclaimable page. At operation 830, the memory management unit may reclaim the reclaimable page with respect to the selected memory region. For example, if the memory allocation requester is the first piece of HW, at operation 830, the memory management unit may reclaim the reclaimable page with respect to the selected memory region of the region of the selected segment 1. The reclaimed page becomes a page to which the memory can be allocated.

At operation 840, the memory management unit performs page movement with respect to the movable page in the selected memory region. After the movement, the corresponding page becomes the page to which the memory can be allocated. In an embodiment of the present disclosure, since the region having the smallest movement is selected on the basis of the bitmap information for the reclaimable page, the movement for securing the contiguous page can be minimized, and the time required for the CMA can be shortened.

At operation 850, the memory management unit may allocate the contiguous memory pages that are secured in the selected region to the memory allocation requester.

Through the above-described method, CMA efficiency can be improved using the segment list that is in the exclusive relationship with the bitmap information for the reclaimable page.

If the memory allocation requester is not included in the segment list, the processing proceeds to operation 825.

At operation 825, the memory region for processing the CMA request may be selected. Since the memory allocation requester is not included in the segment list, the memory manager can select the memory region for processing the CMA request in the other region of the CMA region. When the memory region is selected, the bitmap information may be used. A method for using the bitmap information for the reclaimable page is the same as that as described above at operation 820. On the other hand, if the other region is not set in the CMA region, the memory region for processing the CMA region with respect to the segment region may be selected. Thereafter, the corresponding memory allocator may be managed to correspond to the segment that includes the selected memory region.

Operation 835 corresponds to operation 830. Operation 845 corresponds to operation 840. Operation 855 corresponds to operation 850. As such, a description of operations 835, 845, and 855 are not provided for brevity.

Figure 9:
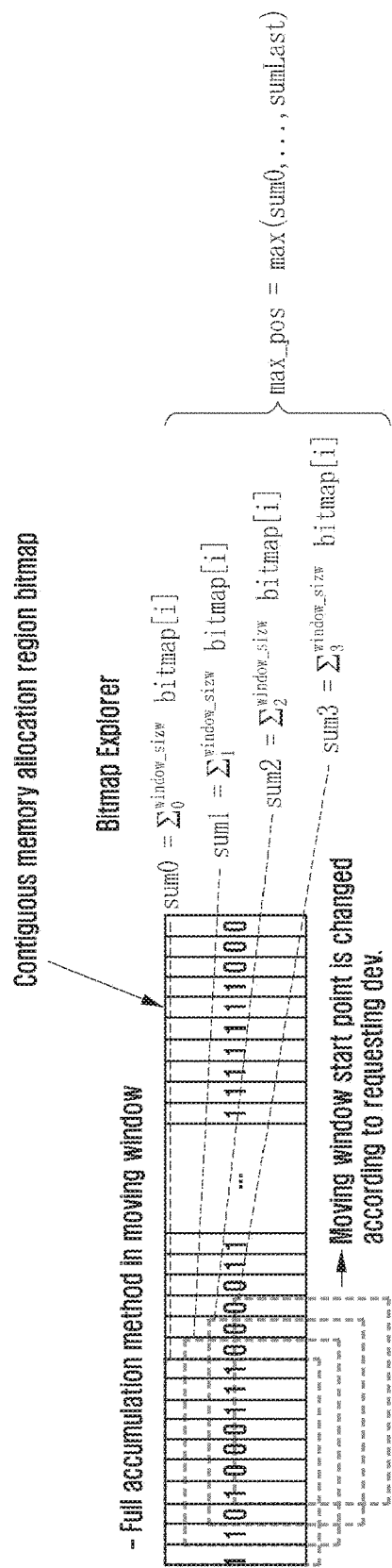
FIG. 9 is a diagram explaining a bitmap search method according to an embodiment of the present disclosure.

FIG. 9 is a diagram explaining a bitmap search method according to an embodiment of the present disclosure.

Referring to FIG. 9, a CMA region bitmap is illustrated. The CMA region bitmap indicates a reclaimable page. For example, in the bitmap, the reclaimable page may be denoted by "1," and the non-reclaimable page may be denoted by "0." The memory management unit may search for the bitmap, and may select the region having the most reclaimable pages region having the least movement target pages) as the contiguous page region for processing the CMA request.

The memory management unit sums the bit values for the bitmap sizes corresponding to the requested contiguous memory size. The region having the largest summed bit value may be selected as the contiguous page region for processing the CMA request. The memory management unit may calculate a bit sum value of the bitmap size for the requested memory size using a moving window. The size of the moving window corresponds to the requested page size. The size of the moving window may be at least equal to or larger than the size of the page that has received the memory allocation request. The memory management unit calculates the bit sum value of the page corresponding to the size of the moving window from the start point to which the contiguous memory has not been allocated. The memory management unit calculates the bit sum value as moving the moving window page by page from the start point. The memory management unit may select the region having the largest bit sum value as the contiguous page region for processing the CMA request. In this case, if all values of the requested sizes correspond to "1" even though the overall region of the CMA region is not searched for, the memory management unit ends the search at that point, and sets the corresponding location as the contiguous page region for processing the CMA request. Further, even in the case where the page having the bit value of "1" among the requested sizes has the ratio that is equal to or larger than a predetermined threshold value, the memory management unit ends the search at that point, and may select the corresponding location as the contiguous page region for processing the CMA request.

Further, when searching for the CMA region, the memory management unit may perform a search and bit calculation only with respect to a specific region on the basis of the segment list and the memory allocation requester. If the memory allocation requester is included in the segment list, the memory management unit may perform a search with respect to the corresponding segment region and may calculate the bit sum value.

Figure 10:
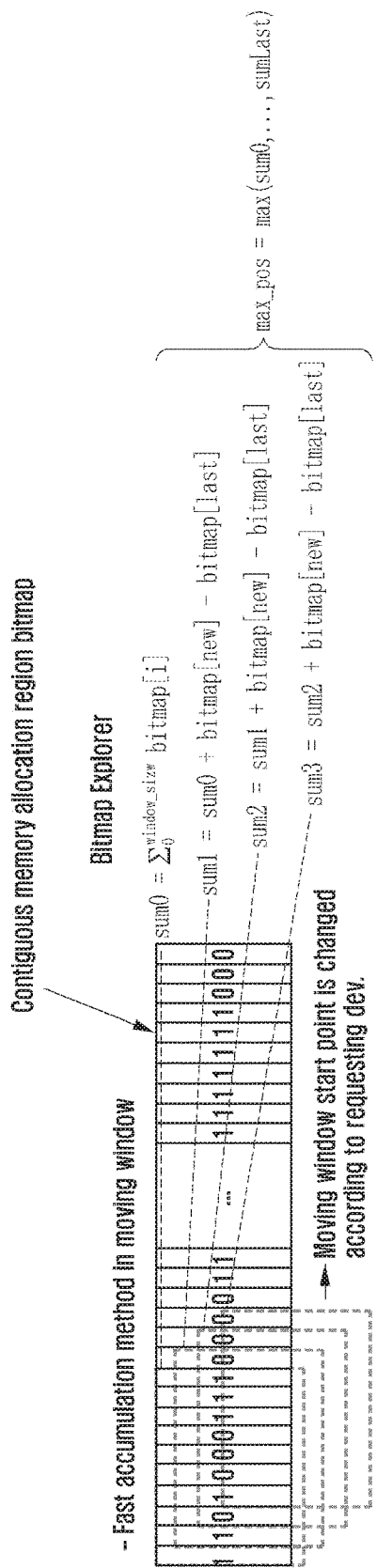
FIG. 10 is a diagram explaining a method for searching for a bitmap according to various embodiments of the present disclosure.

FIG. 10 is a diagram explaining a method for searching for a bitmap according to various embodiments of the present disclosure. The method explained with reference to FIG. 9 may also be applied to FIG. 10. FIG. 10 explains an improved method of FIG. 9.

In an embodiment of the present disclosure, a bit sum value for the pages in the moving window range is calculated while adjusting the moving window. In contrast, in FIG. 10, an improved method for calculating the bit sum value is provided in consideration of the point that the moving window is moved page by page.

Referring to FIG. 10, the bit value that is calculated through the most previous moving window is used. The bit sum value for the current moving window is obtained by subtracting the bit value of a start page of the most previous moving window from the bit sum value that is calculated through the most previous moving window and adding the last page bit value of the current moving window to the result of the subtraction. That is, the bit sum calculation time can be shortened by sharing a duplicate value in the most previous window and the current window and updating only the changed value. In FIG. 10, about 1.5 times a time saving effect can be obtained in searching for the same region.

In an embodiment of the present disclosure, the memory management unit may update the bitmap information that indicates the reclaimable page. Whenever the reclaimable information of the allocated page is changed, the reclaimable page may be updated.

Further, in an embodiment of the present disclosure, the memory management unit may update the segment list.

The segment list may be set with respect to the memory allocation requester that is in the exclusive relationship in accordance with the user's setting or general setting of the electronic device. However, with respect to the memory allocation requester that is not initially set, it is necessary to add the memory allocation requester by updating the segment list. Further, with respect to the memory allocation requester that is set in the segment list, but does not satisfy the exclusive relationship, it is necessary to satisfy the exclusive relationship by updating the list. In an embodiment of the present disclosure, the segment list can be updated using a temporary list, a segment active list, and a segment black list.

Figure 11:
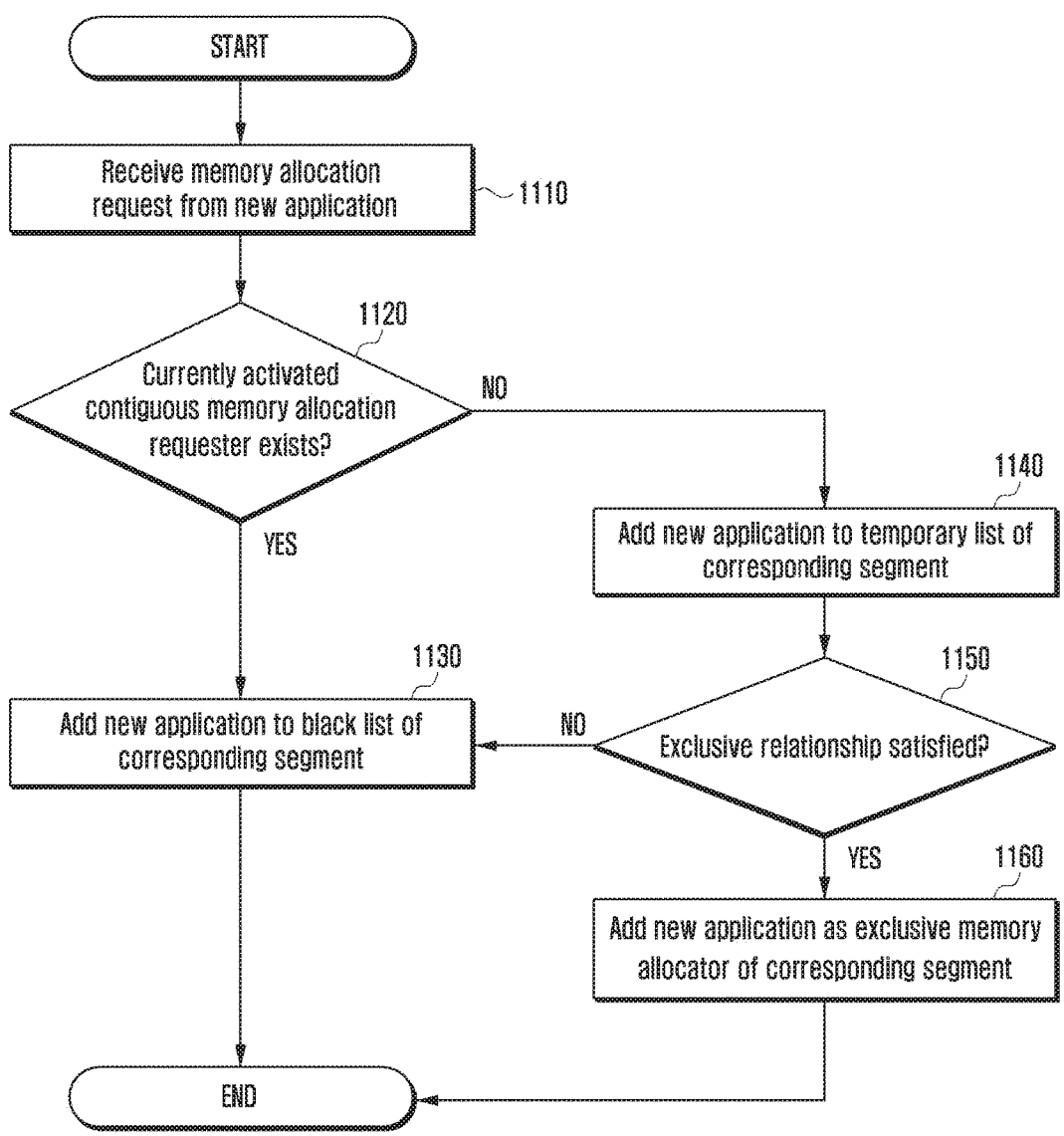
FIG. 11 is a diagram explaining a method for adding a new application to a segment list according to an embodiment of the present disclosure.

FIG. 11 is a diagram explaining a method for adding a new application to a segment list according to an embodiment of the present disclosure.

Referring to FIG. 11, at operation 1110, a memory manager receives a memory allocation request from a new application.

At operation 1120, the memory manager determines whether a currently activated CMA requester exists. A memory management unit may manage an activation list. If there is the CMA requester being activated, the memory management unit adds the corresponding requester to the activation list. Further, if there is a page unit memory allocation requester being activated, the memory management unit adds the corresponding requester to the activation list. In the case where a CMA requester and a page unit allocation requester that are allocated to the same segment are simultaneously in the activation list, it may be determined that the exclusive relationship is not satisfied.

If there is the currently activated CMA requester, the new application is not in an exclusive relationship with the currently activated CMA requester. The memory management unit proceeds to operation 1130 to add a new application to the black list of the segment corresponding to the currently activated CMA requester. Since the application that is added to the black list does not form the exclusive relationship with the CMA requester in accordance with the relationship with the corresponding segment, the added application is unable to be added to the corresponding segment.

There is a high possibility that the new application is in an exclusive relationship with the segment in which there is not the currently activated CMA requester. At operation 1140, the memory manager may add the new application to the temporary list of the segment in which there is not the currently activated CMA requester. The temporary list may be a list of applications for which the exclusive relationship has not been confirmed.

At operation 1150, the memory manager may determine whether the application in the temporary list is in the exclusive relationship with the corresponding segment. For example, the memory manager determines whether the application that is added to the temporary list of a specific segment for a predetermined time is activated simultaneously with the CMA requester of the specific segment.

In the case where the CMA requester and the application in the temporary list are simultaneously activated in the corresponding segment, the memory manager determines that the exclusive relationship is not satisfied, and proceeds to operation 1130. The corresponding application may be deleted from the temporary list, and may be added to the black list of the corresponding segment.

If the CMA requester and the application in the temporarily list are not simultaneously activated in the corresponding segment for a predetermined time, the memory manager determines that the exclusive relationship is satisfied, and proceeds to operation 1160. At operation 1160, since the corresponding application satisfies the exclusive relationship with the CMA requester, the memory manager adds the corresponding application to the page unit memory allocator of the corresponding segment list.

The predetermined segment list can be updated using the activation list and black list as explained with reference to FIG. 11. If the exclusive relationship is not satisfied with respect to the memory allocation requester of the set segment list, the corresponding application may be added to the black list of the corresponding segment, and may be deleted from the page unit allocation requester of the corresponding segment. On the other hand, the application that is deleted from the previous segment list may be added again to the segment list using the method as illustrated in FIG. 11.

In an embodiment of the present disclosure, the CMA region can be managed using the above-described method. In an embodiment of the present disclosure, if a specific memory region is set to be used only for the CMA so that the CMA region can be allocated as the page unit memory, the memory can be prevented from being wasted even in the case where the CMA region is not used.

Further, when the page unit memory is allocated to the CMA region, the page is allocated with respect to the page unit memory allocation requester that is in the exclusive relationship with the CMA requester, and thus time that is used for the contiguous page search and selection and time that is used for the page movement can be minimized. Further, since the contiguous page is searched for and selected using the bitmap information for the reclaimable page, time that is consumed to secure the contiguous memory page can be minimized.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for managing a memory, the method comprising:
   setting a segment list of a contiguous memory allocation region, the segment list including a plurality of segments, each segment associated with a corresponding page unit memory allocation requester and a corresponding contiguous memory allocation requester;
   receiving a first memory allocation request from a first memory allocation requester;
   identifying a segment in the segment list having the first memory allocation requester as one of the corresponding page unit memory allocation requester or the corresponding contiguous memory allocation requester; and
   allocating a page included in the segment in response to the memory allocation request,
   wherein the setting of the segment list comprises:
      identifying a page unit memory allocation requester and a contiguous memory allocation requester that are not activated simultaneously; and
      associating the identified page unit memory allocation requester and the identified contiguous memory allocation requester with a segment of the segment list.

2. The method of claim 1, further comprising managing bitmap information for the contiguous memory allocation region,
   wherein the bitmap information indicates whether a page included in the contiguous memory allocation region is reclaimable.

3. The method of claim 2, further comprising:
   determining that the memory allocation request includes a contiguous memory allocation request; and determining a contiguous memory page region of the contiguous memory allocation region for processing the contiguous memory allocation request based on the bitmap information.

4. The method of claim 3, wherein the determining of the contiguous memory page region comprises determining a page region of the contiguous memory allocation region in which a page movement required for the requested contiguous memory allocation is minimized relative to other page regions of the contiguous memory allocation region.

5. The method of claim 4, wherein the page region in which the page movement is minimized comprises a page region in which a number of reclaimable pages based on the bitmap information is maximized relative to other page regions of the contiguous memory allocation region based on memory allocation request.

6. The method of claim 2, further comprising updating the bitmap information when reclaimable information of the page included in the contiguous memory region is changed.

7. The method of claim 1, further comprising:
receiving a second memory allocation request from a second memory allocation requester;
determining that the second memory allocation requester is a page unit allocation requester;
identifying a second segment in the segment list in which a corresponding contiguous memory allocation requester is not activated; and
adding the second memory allocation requester to the second segment.

8. The method of claim 7, further comprising:
identifying that a third contiguous memory allocation requester corresponding to the second segment is activated while the second memory allocation requester is activated; and
adding the second memory allocation requester to a third segment in the segment list while the second page unit memory allocation is activated.

9. An electronic device comprising:
a memory including a contiguous memory allocation region; and
at least one processor configured to:
set a segment list of the contiguous memory allocation region, the segment list including a plurality of segments, each segment associated with a corresponding page unit memory allocation requester and a corresponding contiguous memory allocation requester,
receive a first memory allocation request from a first memory allocation requester,
identify a segment in the segment list having the first memory allocation requester as one of the corresponding page unit memory allocation requester or the corresponding contiguous memory allocation requester, and
allocate a page included in the segment in response to the memory allocation request,
wherein to set the segment list, the at least one processor is configured to:

identify a page unit memory allocation requester and a contiguous memory allocation requester that are not activated simultaneously, and
associate the identified page unit memory allocation requester and the identified contiguous memory allocation requester with a segment of the segment list.

10. The electronic device of claim 9,
wherein the at least one processor is further configured to manage bitmap information for the contiguous memory allocation region, and
wherein the bitmap information indicates whether a page included in the contiguous memory allocation region is reclaimable.

11. The electronic device of claim 10, wherein the at least one processor is further configured to:
determine that the memory allocation request includes a contiguous memory allocation request, and
determine a contiguous memory page region of the contiguous memory allocation region for processing the contiguous memory allocation request based on the bitmap information.

12. The electronic device of claim 11, wherein the at least one processor is further configured to determine a page region of the contiguous memory allocation region in which a page movement required for the requested contiguous memory allocation is minimized relative to other page regions of the contiguous memory allocation region.

13. The electronic device of claim 12, wherein the page region in which the page movement is minimized comprises a page region in which a number of reclaimable pages based on the bitmap information is maximized relative to other page regions of the contiguous memory allocation region based on memory allocation request.

14. The electronic device of claim 10, wherein the at least one processor is further configured to update the bitmap information when reclaimable information of the page included in the contiguous memory region is changed.

15. The electronic device of claim 9, wherein the at least one processor is further configured to:
receive a second memory allocation request from a second memory allocation requester,
determine that the second memory allocation requester is a page unit allocation requester,
identify a second segment in the segment list in which a corresponding contiguous memory allocation requester is not activated, and
adding the second memory allocation requester to the second segment.

16. The electronic device of claim 15, wherein the at least one processor is further configured to:
identify that a third contiguous memory allocation requester corresponding to the second segment is activated while the second memory allocation requester is activated, and
add the second memory allocation requester to a third segment in the segment list while the second page unit memory allocation is activated.

* * * * *